Patented Aug. 9, 1949

2,478,258

UNITED STATES PATENT OFFICE 2,478,258

VAPOR PHASE ISOMERIZATION OF 1,4-DI-CYANO-2-BUTENE TO 1,4-DICYANO-1-BUTENE

Mark Wendell Farlow, Wilmington, Del., assignor to E. I. du Pont de Nemours & Company, Wilmington, Del., a corporation of Delaware No Drawing. Application June 29, 1948, Serial No. 35,969

8 Claims. (Cl. 260—465.8)

This invention relates to a new method of isomerization of unsaturated nitriles. More particularly it relates to a new method of preparing 1,4-dicyano-1-butene from its isomer, 1,4-dicyano-2-butene.

1,4-dicyano-2-butene has assumed considerable industrial importance since its first synthesis (U. S. Patent 2,342,101), chiefly because it may be used as an intermediate in the preparation of nylon ingredients such as hexamethylenediamine. The isomeric dinitrile, 1,4-dicyano-1-butene, is equally important from the technical standpoint and, in some respects, it offers advantages over 1,4-dicyano-2-butene. For example, it is a liquid at ordinary temperature (1,4-dicyano-2-butene is a solid) and therefore more convenient to handle. Moreover, it is more reactive generally than 1,4-dicyano-2-butene because of its conjugated system of unsaturated linkages. The only method heretofore available for the preparation of 1,4-dicyano-1-butene is that described in Application Ser. No. 756,097, filed by G. F. Hager on June 20, 1947, now Patent No. 2,451,386, wherein 1,4-dicyano-2-butene is isomerized by heating in the presence of a hydrogenating metal, e. g., copper or cobalt, in liquid phase systems comprising a liquid medium having a dielectric constant above 10 at 18° C. This method is quite satisfactory from the standpoint of yields but it is somewhat slow and not well adapted to continuous operation.

It is an object of this invention to provide a method of preparing 1,4-dicyano-1-butene from 1,4-dicyano-2-butene. A further object is to provide a gas-phase process for isomerization of 1,4-dicyano-2-butene to 1,4-dicyano-1-butene. A still further object is to provide a continuous operation for isomerizing 1,4-dicyano-2-butene to 1,4-dicyano-1-butene. Another object is to provide a catalytic vapor phase process for preparing 1,4-dicyano-1-butene from 1,4-dicyano-2-butene with economical catalysts. Other objects will appear hereinafter.

These objects are accomplished by a process of preparing 1,4-dicyano-1-butene which comprises passing vapors of 1,4-dicyano-2-butene at a temperature above about 150° C. over a contact agent which is a solid at the reaction temperature, has a neutral to acidic reaction, and has an adsorptive power at least equivalent to a surface area of 1 square meter per gram.

The suitability of a given substance to act as isomerization catalyst in the process of this invention depends on its adsorptive power for gases or vapors, which in turn depends on its surface area, expressed, for example, in square meters per gram. In the process of this invention it has been found that materials having a surface area of less than one square meter per gram are ineffective in the isomerization of 1,4-dicyano-2-butene to 1,4-dicyano-1-butene. Preferably, the contact agent has a surface area above 3 square meters per gram. The surface area can be as high as can possibly be had, certain materials having a surface area as high as 2000 square meters per gram.

Another essential condition is that the contact agent be neutral to acidic, i. e., non-alkaline, in nature. Practically speaking, this means that an aqueous solution or dispersion of the contact agent must react neutral or acidic. Materials which have an alkaline reaction are ineffective or cause polymerization and/or decomposition of the dicyanobutenes. For example, charcoal impregnated with 15% of its weight of sodium cyanide promotes decomposition of the dicyanobutene to a black, tarry solid which blocks the reaction tube, in spite of the fact that this contact agent has a very high surface area.

The process of the invention may be carried out in any suitable apparatus designed to permit contact of the vapors of 1,4-dicyano-2-butene with the isomerization agent. Most conveniently the apparatus is a reaction tube constructed of glass or metal and provided with a heating device, means to introduce and circulate the vapors of 1,4-dicyano-2-butene over the contact agent and means to condense the effluent vapors.

To achieve a practical reaction rate it is desirable to operate at a temperature above about 150° C. The upper limit of temperature is dictated only by the decomposition point of the reactants. Preferably, it should not exceed 300° C., a particularly preferred temperature range being between 175° C. and 275° C. If desired, the reaction may be carried out at sub-atmospheric pressure, for example, of the order of 500 mm. to 1 mm. of mercury, or superatmospheric pressures may be used with suitably designed equipment.

The 1,4-dicyano-2-butene may be vaporized and led as such over the contact agent, in which case it is convenient to use reduced pressures, or it may be conducted over the contact agent by means of a carrier gas, which may be any gas substantially inert toward the dicyanobutenes and contact agent at the operating temperature. With contact agents which have substantially no reducing action on the dicyanobutene, hydrogen may be used as the carrier gas. Other suitable carrier gases or nitrogen, carbon dioxide and the like.

The isomerization reaction is in general rapid and the contact time is therefore not very critical. A contact time as low as 2 to 3 seconds is generally sufficient, although it may be as high as 100 seconds or more. In general, one volume of contact agent produces between 0.1 and 10 volumes of liquid 1,4-dicyano-1-butene per hour.

The reaction product, 1,4-dicyano-1-butene, may be isolated from any unchanged 1,4-dicyano-2-butene or by-products, if any, by distillation, preferably under reduced pressure. It is a colorless liquid consisting of a mixture of geometric isomers which may be separated by fractionation although this is usually unnecessary. The isomer assigned the trans structure boils at 84.5–86.5° C. at 0.35–0.44 mm. pressure and has a refractive index $n_D^{25}$:1.4646. The isomer assigned the cis structure boils at 99.5–102.5° C. at 0.38 mm. pressure and has a refractive index $n_D^{25}=1.4677$.

The invention is illustrated in greater detail in the examples which follow:

Example I

A vertically mounted glass tube having an internal diameter of 3.75 cm. and a length of 75 cm., is heated externally by means of an electric furnace 45 cm. long. In the heated portion of the tube are placed 100 ml. of pelleted copper chromite having a surface area of 7.1 sq. m./g., prepared substantially according to U. S. Patents 1,746,783; 1,964,001; 2,066,153; and 2,137,407. Above the copper chromite pellets are placed 100 ml. of broken sections of 6 mm. glass tubing to serve as preheater and vaporizer. The copper chromite is heated to 150° C. and reduced with a gaseous hydrogen-nitrogen mixture, the ratio and rates of the gases being adjusted so that the exothermic reduction reaction does not raise the temperature higher than 250° C. When reduction of the copper chromite is complete, as evidenced by cessation of the exothermic reaction, the temperature is adjusted to 250° C. and a mixture of hydrogen (60 liters per hour) and molten, 1,4-dicyano-2-butene (20–25 grams per hour) is introduced at atmospheric pressure into the top of the reaction tube. The hot gases are led from the bottom of the reactor to a water-cooled condenser system where the product is collected. After an initial two-hour period, during which the activity of the contact agent reaches a steady state, there is produced substantially quantitative conversion of the 1,4-dicyano-2-butene to 1,4-dicyano-1-butene, which is obtained as a liquid having a refractive index $n_D^{25}$ of 1.4648.

Example II

Using the same apparatus and the same contact agent as in Example I, a mixture of 25 g./hour of 1,4-dicyano-2-butene and 100 l./hour of nitrogen is vaporized and passed at atmospheric pressure over 50 ml. of the contact agent at a temperature of 200° C. There is produced, per hour, 23 g. of almost colorless 1,4-dicyano-1-butene, $n_D^{25}=1.4658$.

Example III

An alkali-free nickel chromite is prepared as follows: Nickel nitrate hexahydrate, 1455 g., is dissolved in 2500 ml. of water and the solution is heated to 80–90° C. A solution prepared from 630 g. of ammonium dichromate, 337 ml. of 28% aqueous ammonia and 2500 ml. of water is then added slowly, whereupon nickel ammonium chromate precipitates. The precipitate is filtered, washed thoroughly with water and dried at 105° C. The dry material is heated in thin layers until the exothermic decomposition to nickel chromite sets in, and conversion to the chromite is finally completed by heating overnight in air at 400° C. The resulting black-powder, after addition of 1% of graphite as lubricant, is converted into 6 mm. pellets and the pellets are reduced at 250° C. in a stream of hydrogen. This contact agent has a surface area of 5–10 sq. m./g.

A mixture of 36 g./hour of molten 1,4-dicyano-2-butene and 200 l./hour of hydrogen gas is vaporized and passed at 260° C. and atmospheric pressure over 50 ml. of the above contact agent. The reaction product is a dark oil, $n_D^{25}=1.4668$, which consists essentially of 1,4-dicyano-1-butene.

Example IV

Activated coconut charcoal of 8–14 mesh size is freed from any basic impurities which it may contain by heating it with 10% nitric acid at 100° C. for 6 hours, followed by thorough washing with distilled water and drying at 105° C. This material has a surface area of 700–800 square meters per gram. Molten 1,4-dicyano-2-butene (25–54 g./hour) is vaporized in hydrogen (158 l./hour) and the gaseous mixture is passed at atmospheric pressure through 80 cc. of the charcoal maintained at 260° C. The product from four hours' operation is clear, colorless 1,4-dicyano-1-butene, $n_D^{25}=1.4658$–1.4669, obtained in 96% conversion.

Example V

A 76 g. sample of coconut charcoal purified as described above is heated with a solution prepared by dissolving 61.5 g. of ferric nitrate nonahydrate in sufficient water to produce 115 ml. of solution. The slurry is evaporated to dryness and the residue heated in nitrogen at 375–400° C. to bring about decomposition to ferric oxides, after which it is reduced in a stream of hydrogen at gradually increasing temperature up to 475° C. A mixture of 36 g./hour of 1,4-dicyano-2-butene and 270 l./hour of hydrogen is vaporized and passed at 260° C. and atmospheric pressure over 50 ml. of the above contact agent. There is obtained quantitative isomerization to 1,4-dicyano-1-butene, obtained as a colorless liquid $n_D^{25}=1.4653$.

Example VI

Activated, 8–14 mesh silica gel of surface area 500–600 sq. m./g., is treated with dilute nitric acid to remove basic materials as described in Example IV, then dried at 400° C. Molten 1,4-dicyano-2-butene (23 g./hour) is vaporized in hydrogen (158 l./hour) and the gaseous mixture is passed at atmospheric pressure through 50 ml. of the silica gel at 260° C. The product is 1,4-dicyano-1-butene, obtained in 98% conversion as a pale yellow oil, $n_D^{25}=1.4665$.

Example VII

Activated alumina of 8–14 mesh size and having a surface area of 425 sq. m./g. is treated with nitric acid as described above and dried at 105° C. Molten 1,4-dicyano-2-butene (26 g./hour) is vaporized in hydrogen (158 l./hour) and the gaseous mixture is passed at atmospheric pressure through 50 ml. of the alumina at 260° C. The product is 1,4-dicyano-1-butene, obtained in 84% conversion as a pale yellow oil, $n_D^{25}=1.4680$.

*Example VIII*

In contradistinction with the preceding example, alumina which has been similarly treated but which has a surface area of 0.08 sq. m./g. (the so-called "tabular" alumina) is ineffective as an isomerization catalyst. However, superficial treatment of this material with a deposited solid of high surface area renders it at least partially effective. This may be done by impregnating the tabular alumina with aqueous palladium nitrate to a palladium content of 0.06% by weight and reducing at 260° C. in hydrogen. Molten 1,4-dicyano-2-butene (25 g./hour) is vaporized in nitrogen (115 g./hour) and the mixture is passed through 50 cc. of the contact agent at 260° C. The reaction product is a mixture of 1,4-dicyano-1-butene and unchanged 1,4-dicyano-2-butene.

A generally adopted test for measuring surface area in terms of gas adsorption is the Brunauer-Emmett-Teller method, as described in a paper by P. H. Emmett in the report of the March 4, 1941 meeting of the American Society for Testing Materials, entitled "Symposium on New Mtehods for Particle Size Determination in the Subsieve Range," pages 95–105. For the sake of presenting a complete description, the test proceduce is summarized as follows:

The sample to be tested (from one to ten grams, depending on the magnitude of the surface area), consisting of a finely divided powder or of small lumps of porous material is sealed into a glass bulb provided with a capillary tube outlet which is closed off by means of a stopcock. The sample tube is evacuated at a temperature ranging from room temperature to 300–400° C. to remove adsorbed gases and water. When degassing is complete the sample tube is transferred to the adsorption side of the apparatus. The empty space in the tube is measured with helium gas at the temperature of liquid nitrogen. The helium gas is pumped out and the sample is then exposed to a measured amount of nitrogen at a series of low pressures ranging from about 50 mm. up to 250 mm. and the amount of gas adsorbed by the sample at each pressure is determined. When these data are plotted according to the following equation (the so-called Teller equation) a straight line is obtained $$\frac{P}{V(P_o-P)}=\frac{1}{V_mC}+\frac{C-1}{V_mC}\cdot\frac{P}{P_o}$$

V is the volume of gas adsorbed at the pressure P, and at a temperature where $P_o$ is the vapor pressure of the liquid gas. $V_m$ is the volume of gas required to form a monomolecular layer and C is a constant related exponentially to the difference between the heat of liquefaction and the heat of adsorption of the adsorbate. Mathematically it can be shown that when $P/V(P_o-P)$ is plotted against $P/P_o$, $V_m$ is the reciprocal of the sum of the intercept and the slope of the graph. A factor of 4.38 is used to convert $V_m$ values in cubic centimeters of gas to square meters of monomolecular layer. The specific surface area in square meters per gram is calculated by the following equation:

Area of sample in sq. in./gram=
$$\frac{4.38\times V_m}{\text{weight of sample in grams}}$$

As has already been mentioned, it is necessary in the process of this invention that the contact agent be a solid in the temperature range of 150–300° C., that it be non-alkaline in reaction and that it has a surface area of at least one square meter per gram. As regards the last condition it has been found that materials such as small copper rivets, glass helices, stainless steel helices and tabular alumina are ineffective as isomerization agents. Provided the above-mentioned conditions are fulfilled, any material can be used, including for example, graphite, acetylene black, barium sulfate, titanium dioxide, zirconium silicate, vermiculite, lead chromate, copper powder, iron powder, zinc sulfide, phosphotungstic acid, iron oxide, mica, magnesium silicate and the like. The chemical composition of the contact agent appears to be immaterial provided it has the necessary physical properties and a neutral to acidic character.

As many apparently widely different embodiments of this invention may be made without departing from the spirit and scope thereof, it is to be understood that this invention is not limited to the specific embodiments thereof except as defined in the appended claims.

I claim:

1. A vapor phase process for isomerizing 1,4-dicyano-2-butene to 1,4-dicyano-1-butene which comprises passing vapors of 1,4-dicyano-2-butene at a temperature above 150° C. and below the decomposition temperature of said butenes over a contact catalytic agent which is a solid at the reaction temperature, has a neutral to acidic reaction and has an adsorptive power at least equivalent to a surface area of 1 square meter per gram.

2. A vapor phase process for isomerizing 1,4-dicyano-2-butene to 1,4-dicyano-1-butene which comprises passing vapors of 1,4-dicyano-2-butene at a temperature between 175° and 275° C. over a contact catalytic agent which is a solid at the reaction temperature, has a neutral to acidic reaction and has an adsorptive power at least equivalent to a surface area of 3 square meters per gram.

3. A vapor phase process for isomerizing 1,4-dicyano-2-butene to 1,4-dicyano-1-butene which comprises passing an inert carrier gas and vapors of 1,4-dicyano-2-butene at a temperature between 175° and 300° C. over a contact catalytic agent which is a solid at the reaction temperature, has a neutral to acidic reaction and has an adsorptive power at least equivalent to a surface area of 3 square meters per gram.

4. A vapor phase process for isomerizing 1,4-dicyano-2-butene to 1,4-dicyano-1-butene as set forth in claim 1 in which said temperature is between 175° and 300° C.

5. A vapor phase process for isomerizing 1,4-dicyano-2-butene to 1,4-dicyano-1-butene as set forth in claim 1 in which the adsorptive power of said catalyst is at least equivalent to a surface area of three square meters per gram.

6. A vapor phase process for isomerizing 1,4-dicyano-2-butene to 1,4-dicyano-1-butene as set forth in claim 3 in which said inert carrier gas is hydrogen.

7. A vapor phase process for isomerizing 1,4-dicyano-2-butene to 1,4-dicyano-1-butene as set forth in claim 3 in which said inert carrier gas is nitrogen.

8. A vapor phase process for isomerizing 1,4-dicyano-2-butene to 1,4-dicyano-1-butene as set forth in claim 2 in which said contact catalytic agent comprises copper chromite having the physical and chemical characteristics specified in said claim 2.

MARK WENDELL FARLOW.

REFERENCES CITED

The following references are of record in the file of this patent:

UNITED STATES PATENTS

| Number | Name | Date |
|---|---|---|
| 2,342,101 | Cass | Feb. 22, 1944 |
| 2,352,515 | Bruson | June 27, 1944 |
| 2,384,630 | Mahan | Sept. 11, 1945 |
| 2,448,755 | Zellner | Sept. 7, 1948 |